United States Patent [19]

Schmitt

[11] Patent Number: 5,587,675
[45] Date of Patent: Dec. 24, 1996

[54] MULTICLOCK CONTROLLER

[75] Inventor: Kenneth C. Schmitt, Colorado Springs, Colo.

[73] Assignees: AT&T Global Information Solutions Company, Dayton, Ohio; Hyundai Electronics America, San Jose, Calif.; Symbios Logic Inc., Fort Collins, Colo.

[21] Appl. No.: 105,990

[22] Filed: Aug. 12, 1993

[51] Int. Cl.$^6$ .................................................. H03K 17/00
[52] U.S. Cl. ........................................... 327/99; 327/298
[58] Field of Search ................................. 307/269, 268; 328/55, 63, 108, 115, 116, 137, 154; 327/99, 144, 145, 291, 293, 294, 298, 407

[56] References Cited

U.S. PATENT DOCUMENTS

| | | | |
|---|---|---|---|
| 4,053,944 | 10/1977 | Dixon | 364/200 |
| 4,137,563 | 1/1979 | Tsunoda | 364/200 |
| 4,171,539 | 10/1979 | Tawfik et al. | 364/900 |
| 4,317,180 | 2/1982 | Lies | 364/707 |
| 4,615,005 | 9/1986 | Maejima et al. | 364/200 |
| 4,636,734 | 1/1987 | Genrich | 328/55 |
| 4,686,386 | 8/1987 | Tadao | 327/142 |
| 4,713,621 | 12/1987 | Nakamura et al. | 328/63 |
| 4,748,559 | 5/1988 | Smith et al. | 364/200 |
| 4,805,195 | 2/1989 | Keegan | 328/63 |
| 4,853,653 | 8/1989 | Maher | 327/141 |
| 4,855,615 | 8/1989 | Humpleman | 327/146 |
| 4,893,271 | 1/1990 | Davis et al. | 364/900 |
| 4,972,518 | 11/1990 | Matsuo | 307/269 |
| 4,982,116 | 1/1991 | Lee | 327/99 |
| 5,012,406 | 4/1991 | Martin | 364/200 |
| 5,025,387 | 6/1991 | Frane | 364/493 |
| 5,083,266 | 1/1992 | Watanabe | 395/275 |
| 5,136,180 | 8/1992 | Caviasca et al. | 327/99 |
| 5,142,684 | 8/1992 | Perry et al. | 395/750 |
| 5,155,380 | 10/1992 | Hwang et al. | 307/269 |
| 5,227,672 | 7/1993 | Sawtell | 327/141 |
| 5,254,888 | 10/1993 | Lee et al. | 327/152 |
| 5,274,678 | 12/1993 | Ferolito et al. | 327/141 |
| 5,278,873 | 1/1994 | Lowery | 328/55 |
| 5,289,050 | 2/1994 | Ogasawara | 327/141 |
| 5,315,181 | 5/1994 | Schowe | 328/63 |
| 5,357,146 | 10/1994 | Heimann | 327/298 |

FOREIGN PATENT DOCUMENTS 402113727  4/1990  Japan ................................. 327/407

*Primary Examiner*—Timothy P. Callahan
*Assistant Examiner*—T. Lam
*Attorney, Agent, or Firm*—Wayne P. Bailey; Albert L. Sessler, Jr.

[57] ABSTRACT

A multi-clock controller circuit includes first and second inputs to which two different types of clocks, such as a crystal oscillator clock and a TTL clock, can be applied. The circuit automatically senses which of the two input clock signals is active and provides that clock signal to an output of the circuit. Power up and power down conditions are achieved without generating non-standard clock pulses on the output through use of a synchronizer stage comprising a plurality of flip flops which determines the number of input clock cycles which are received by the circuit before output clock signals for power up or power down conditions commence.

30 Claims, 5 Drawing Sheets

5,587,675

MULTICLOCK CONTROLLER

BACKGROUND OF THE INVENTION

The present invention relates to a multi-clock controller, and more particularly relates to a multi-clock controller which has the capability to power down and power up the clock signals used for chips used in lower power applications, using either one of at least two different clock signals.

In integrated circuit applications, such as in low power computers (i.e. notebook or laptop), there is a need for system clocks to be turned off and on in an orderly fashion, with no runt pulses or metastable conditions. Turning the clocks off at appropriate times will greatly reduce the power consumption and will extend the battery life of the system.

A second need in such systems is the capability for automatic selection of multiple clock sources. Such a capability enables the switching of clock inputs to a chip containing the circuit from different sources without any intervention being necessary by the user. Such a capability would save on the number of external pins required and would make the circuit operation more transparent to the user.

SUMMARY OF THE INVENTION

The clock controller circuit of the present invention provides for the orderly powering down and powering up of the clock signals for chips used in low power applications. Also provided is the capability for automatic sensing of whether the clock being used is a crystal oscillator input or some other clock input, such as a TTL or CMOS level clock input (hereinafter referred to as a TTL clock), and the further capability of the circuit to adjust its operation accordingly.

It is accordingly an object of the present invention to provide a clock controller circuit which is capable of automatic detection of whether a clock input signal is an oscillator signal or a TTL clock signal.

Another object is to provide a controller circuit capable of synchronized power down and power up of the external clock input.

Another object is to provide a controller circuit having an ultra-low power draw during power-down operation.

Additional benefits and advantages of the present invention will become apparent to those skilled in the art to which this invention relates from the subsequent description of the preferred embodiment and the appended claims, taken in conjunction with the accompanying drawings.

DETAILED DESCRIPTION

Figure 1A:
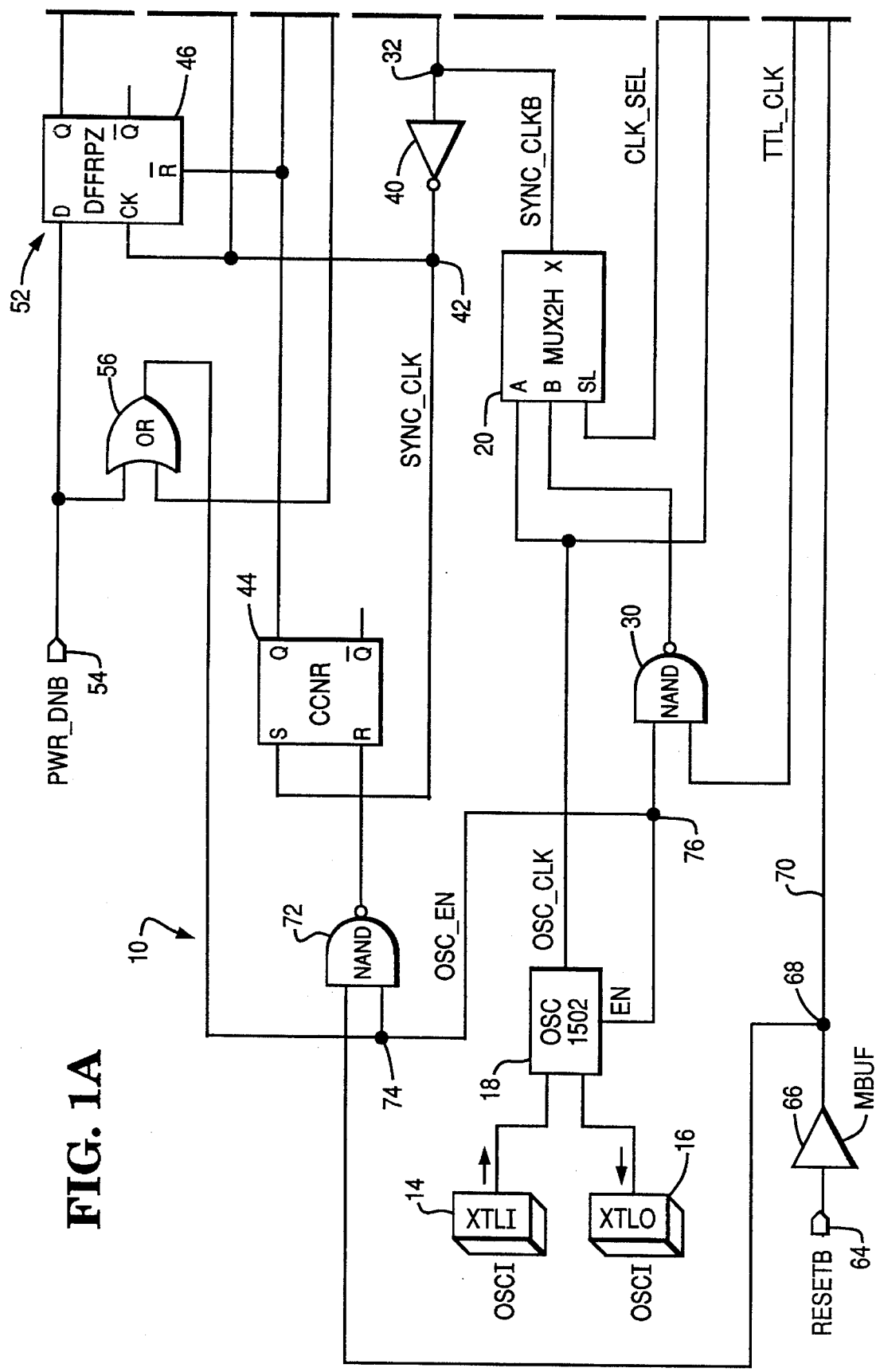
FIGS. 1A and 1B, taken together, comprise a diagram of the novel circuit of the present invention.
Figure 1B:
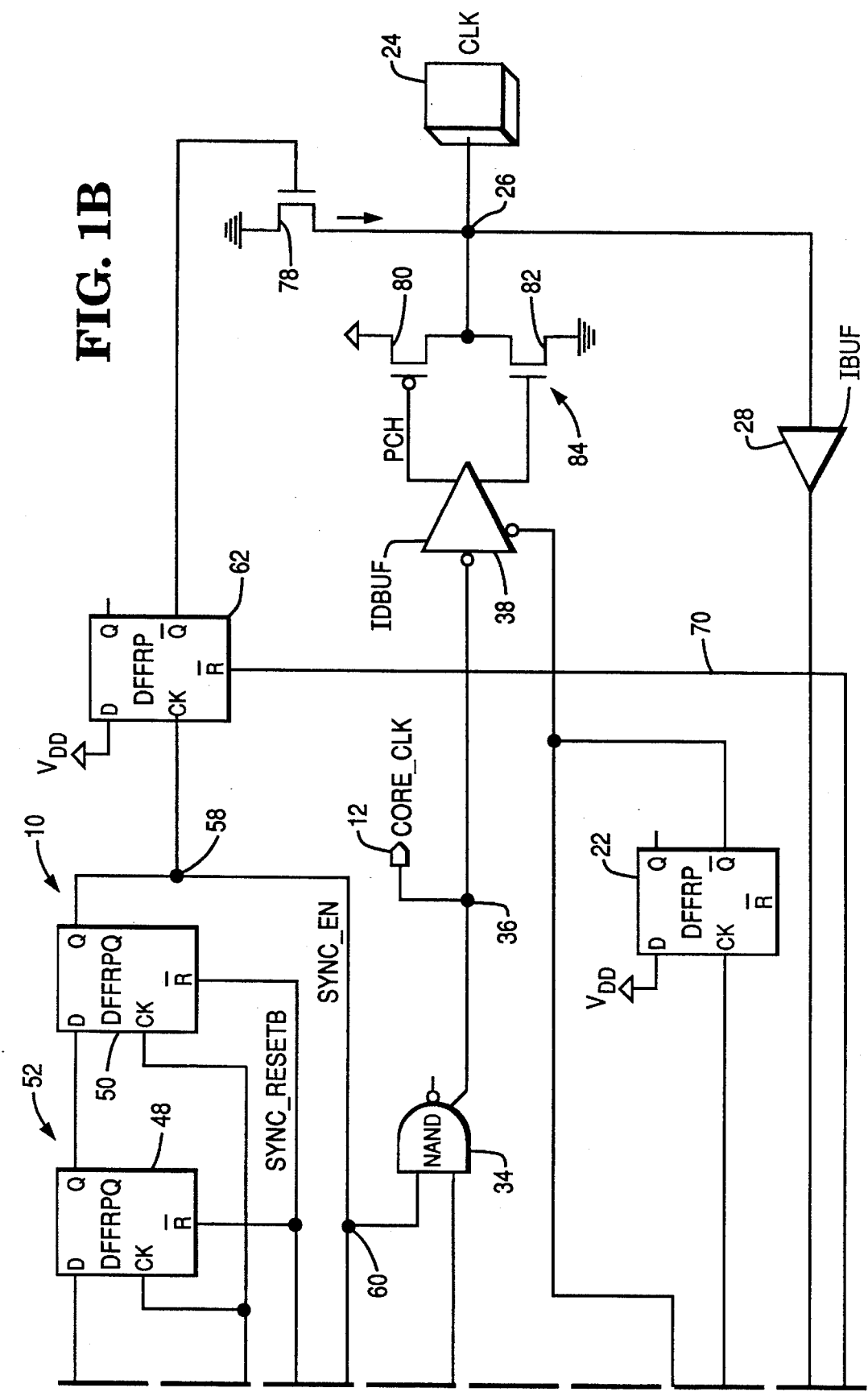

The novel power-down multi-clock controller circuit of the present invention is shown in FIGS. 1A and 1B. Either one of two different input signals may be applied to the circuit 10 to provide a circuit clock output signal CORE_CLK on a terminal 12.

A first of these two input signals is taken from an oscillator (not shown) which is coupled to pads 14 and 16, on which oscillator signals OSCI and OSCO appear. Application of the oscillator signals to the remainder of the circuit 10 is controlled by a gate 18, to which the signal OSCI is applied. A signal OSC_EN is also applied to the gate 18, as will subsequently be described, and the output signal of the gate 18, designated OSC_CLK, is applied to input A of a multiplexer 20, as well as to a clock input of a flip flop 22. The $\overline{Q}$ output of the flip flop 22 is applied to the SL (select) input of the multiplexer 20.

The second of the two input signals for the circuit 10 is a TTL or other clock input CLK which is applied to a pad 24 of the circuit 10. The circuit path for this signal extends through a node 26 and a buffer 28 to one input of a NAND gate 30. A second input of the NAND gate 30 is coupled to the circuit path on which the signal OSC_EN appears. The output of the NAND gate 30 is coupled to the B input of the multiplexer 20.

It may be noted that the CLK pad 24 can act as a second output terminal for the circuit 10 when an oscillator input signal is applied to the OSCI pad 14.

The output of the multiplexer 20, which is designated as signal SYNC_CLKB, is applied through a node 32 to one input of a NAND gate 34. The output of said NAND gate is designated as the output signal CORE_CLK and is applied through a node 36 to the terminal 12. From the node 36, a second circuit path extends to one input of a buffer 38, as will subsequently be described in greater detail.

Returning to the node 32, an additional circuit path extends through an inverter 40 and a node 42 to the S input of a flip flop 44. From the node 42, additional circuit paths extend to the clock inputs of three flip flops 46, 48 50, which together comprise a synchronizer stage 52. The Q output of the flip flop 44 is coupled to the $\overline{R}$ input of each of the flip flops 46, 48, 50.

A signal PWR_DNB is applied to a terminal 54 which is coupled to the D input of the flip flop 46 and is also coupled to one input of an OR gate 56. The Q output of the flip flop 46 is coupled to the D input of the flip flop 48, and the Q output of the flip flop 48 is coupled to the D input of the flip flop 50. The signal from the Q output of the flip flop 50 is designated SYNC_EN and is connected through nodes 58 and 60 to a second input of the OR gate 56. From the node 58, a circuit path extends to a clock input of a flip flop 62. From the node 60, a circuit path extends to a second input of the NAND gate 34.

From a terminal 64, a signal RESETB is applied through a buffer 66 and a node 68 via a circuit path 70 to the $\overline{R}$ input of the flip flop 62. From the node 68, a circuit path extends to one input of a NAND gate 72. The output signal of the OR gate 56 is designated OSC_EN, and is applied through a node 74 to a second input of the NAND gate 72, as well as through a node 76 to one input of the NAND gate 30, as previously mentioned, and to the EN input of the gate 18.

Returning to the flip flop 62, its D input is coupled to a source of potential $V_{DD}$, and its $\overline{Q}$ output is coupled to the gate of an NMOS transistor 78, which is grounded at its source and connected at its drain to the node 26.

The buffer 38, to which the signals CORE_CLK and CLK_SEL are applied, is coupled to a pair of transistors 80, 82, which together generally function as an inverter 84 that is coupled to the node 26.

Figure 4:
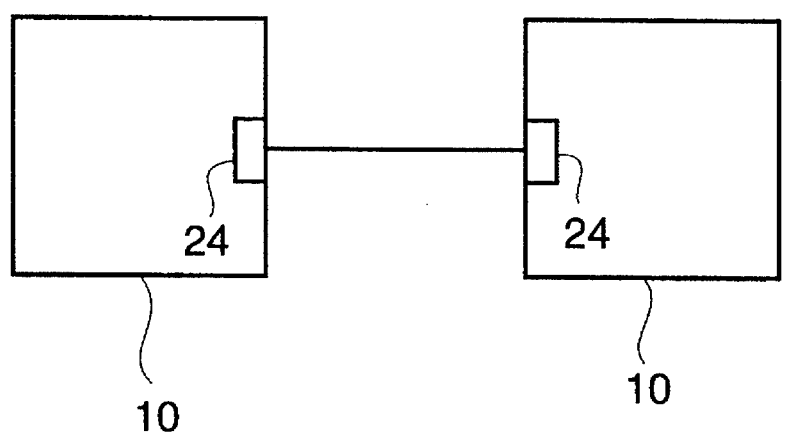
FIG. 4 is a diagram showing cascading of multi-clock controller circuits.

The operation of this circuit will now be described, and may be readily understood if a sequence of events is followed from a reset or chip power up condition. During chip reset, either the OSCI input 14 will have an oscillator running on it or this pad will be grounded and a clock input will be present on the CLK pad 24. It should be noted that it is not necessary for a clock to be running on the CLK pad 24 during reset. The circuitry will default to this pad as the clock input if it does not sense any activity on the OSCI pad 14. This allows cascading multiple clock control circuits on different chips (for example, running the CLK output from the first chip, as shown in FIG. 4 to the CLK input of another chip).

Figure 2:
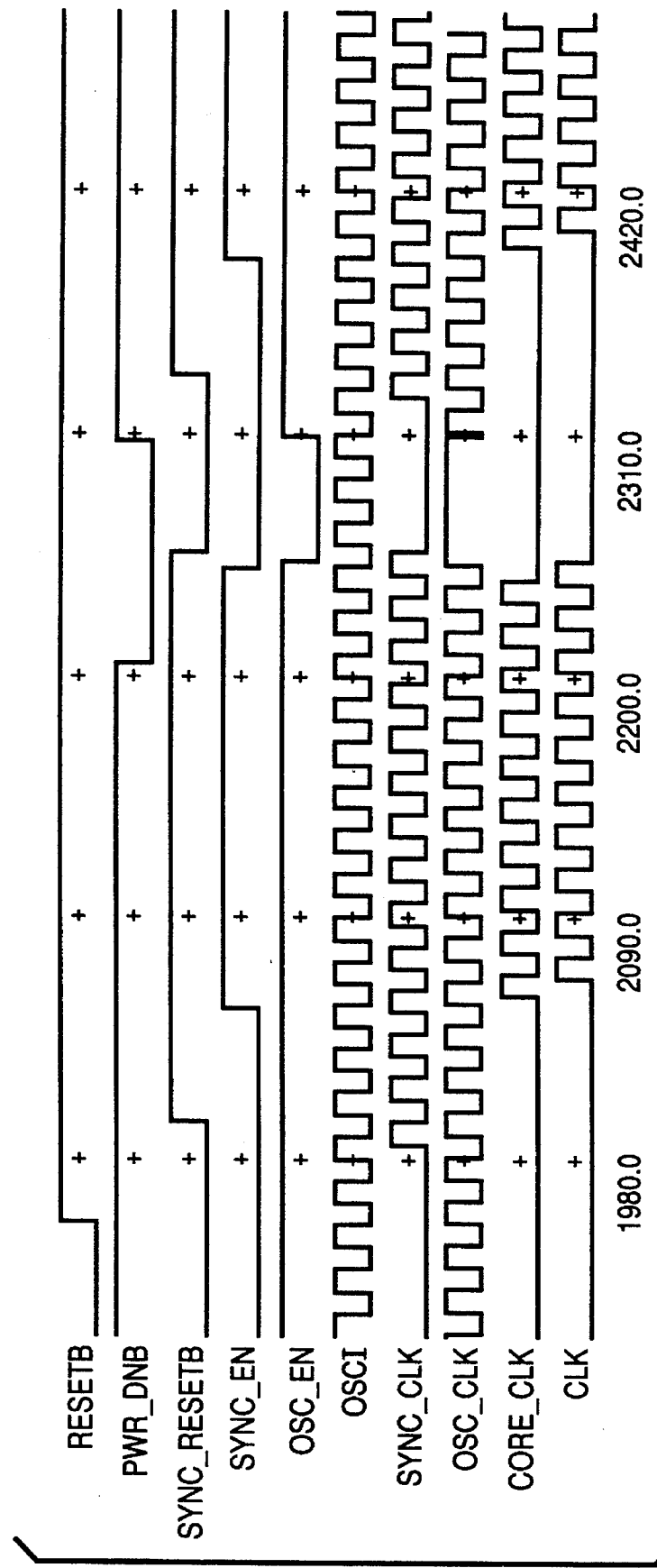
FIG. 2 is a diagram showing waveforms associated with operation of the circuit of FIGS. 1A and 1B when the clock input signal is provided by an oscillator.
Figure 3:
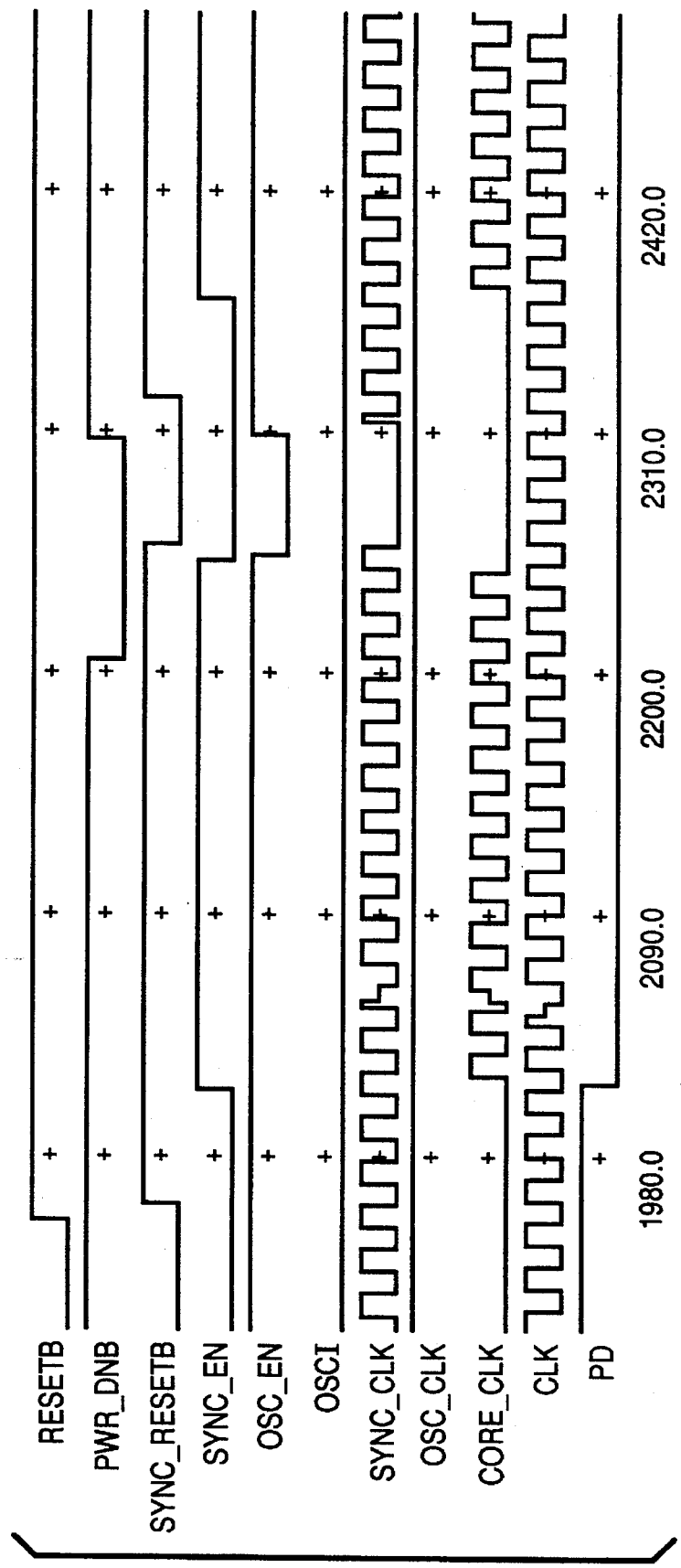
FIG. 3 is a diagram showing waveforms associated with operation of the circuit of FIGS. 1A and 1B when the clock input signal is provided by a TTL clock.

Reference may be had to the waveform diagrams of FIGS. 2 and 3, relating to the input signals OSCI and CLK, respectively, to aid in understanding the operation of the circuit.

It should be noted that this circuit automatically senses which one of the two signals OSCI and CLK is active and provides that clock signal to the output. Only one of the two input signals will be electrically coupled to the circuit at any one time. The circuit also achieves "power up" and "power down" states without generating spikes on the output signal CORE_CLK.

Let it be assumed that the reset signal RESETB is active, to reset the circuit. During reset, the CLK output, which may appear on the pad 24, is turned off. The transistor 78 is turned on, which pulls down the pad 24, if this pad happens to be "floating".

The clock detection circuitry comprises the flip flop 22 and the multiplexer 20. During the time that the RESETB signal on the terminal 64 is active, the signal CLK_SEL is at a logic one level, selecting the signal CLK on the pad 24 to be the default input.

When the signal RESETB goes inactive, the flip flop 22 will switch the signal CLK_SEL to a logic zero level only if the OSCI input on pad 14 is running. If this is the case, the multiplexer 20 is switched to input A, which is the input for the oscillator signal OSCI. On the other hand, if no activity is sensed on the pad 14, the signal CLK_SEL will remain at a logic one level, and the multiplexer 20 will select input B, to which the clock signal TTL from the pad 24 is applied, through the node 26, the buffer 28 and the NAND gate 30.

It should be noted that during a reset condition of the circuit 10, there are no CORE_CLK output pulses on the terminal 12. The signal RESETB in the active state forces the signal SYNC_EN low, and disables any internal clock pulses, as will subsequently be described in greater detail.

During a reset operation, the synchronizer stage 52, comprising the flip flops 46, 48 and 50, is reset, causing the signal SYNC_EN, which is taken from the Q output of the flip flop 50, to assume a logic zero state, thereby causing the NAND gate 34 to disable the output signal CORE_CLK.

When the signal RESETB goes to an inactive state, and the appropriate input clock is selected, as described above, three or four clock cycles are required to start the output signal CORE_CLK. The explanation for this relates to the generation of signals SYNC_RESETB and SYNC_EN, and is as follows. After the signal RESETB goes inactive, the flip flop 44 sets the signal SYNC_RESETB to a logic one level when it senses a logic one level on the signal SYNC_CLK. By doing this, the flip flop 44 guarantees a full clock pulse to the synchronizer stage 52. After three more cycles, the signal SYNC_EN will go to a logic one level and enable the output signal CORE_CLK. In order to prevent a short pulse on the signal CORE_CLK, the signal SYNC_EN from the flip flop 50 must go to an active state before the next transition of the signal SYNC_CLK which passes through the inverter 40. The synchronizer stage 52, shown in the illustrated embodiment as comprising the flip flops 46, 48, 50, can be modified by changing the number of flip flops to give any delay the user wishes, upon power up or power down.

The first time that the signal SYNC_EN becomes active after a reset, it will clock the flip flop 62, thus shutting off the internal pull-down transistor 78. This prevents unnecessary current draw during low-power mode.

When the signal PWR_DNB goes to a low (active) logic level, this indicates that the circuit will be put into a low power mode. Three clock cycles after the signal PWR_DNB goes to an active state, the signal SYNC_EN will go to a low state, causing the output signal CORE_CLK to be held in a low state. As before, the disabling of the output signal CORE_CLK without generating short clock pulses involves the inverter 40 and the flip flop 50. After the signal SYNC_EN goes low, the signals OSC_EN and SYNC_RESETB will also go low. This will reset the synchronizer stage 52 and disable the gate 18, which eliminates any sources of high current draw from clocked circuits. In fact, the only power draw would be due to an external clock driving the CLK pad 24. In this case, the only power draw would be the toggling of the buffer 28.

The circuit will remain in this powered down state until the signal PWR_DNB goes to a logic one (inactive) level. This action will enable the input clock, either OSCI or CLK, by enabling the signal OSC_EN, and will restart the internal clocks as discussed above for the reset operation.

It may be noted that if an oscillator is used for the clock input on pad 14, an output on the CLK pad 24 will not be present until six clock cycles after the reset goes inactive. It may be also noted that the OSCI pad 14 must be grounded if an external TTL clock is driving the CLK pad 24.

Although the invention has been described with particular reference to a preferred embodiment thereof, variations and modifications of the present invention can be effected within the spirit and scope of the following claims.

What is claimed is:

1. A multi-clock controller circuit, comprising:

a first input for receiving a first type of input clock signal;

a second input for receiving a second type of input clock signal;

an output for providing a circuit output clock signal;

a circuit device for sensing and selecting which one of the two inputs has an active clock signal applied thereto, and for coupling said active clock signal to said output; and a synchronizer stage for delaying the output signal for a period sufficient to avoid non-standard output pulses during powering down of the multi-clock controller circuit.

2. The multi-clock controller circuit of claim 1, also including first and second gates for controlling inputs to said circuit device for coupling whichever of the first and second inputs has an input clock signal applied thereto to the circuit device.

3. The multi-clock controller circuit of claim 1, in which the clock signal applied to the first input is a crystal oscillator signal.

4. The multi-clock controller circuit of claim 1, in which the clock signal applied to the second input is a TTL clock signal.

5. The multi-clock controller circuit of claim 1, in which the clock signal applied to the second input is a CMOS clock signal.

6. The multi-clock controller circuit of claim 1, in which said synchronizer sage comprises a plurality of coupled flip flops.

7. The multi-clock controller circuit of claim 6, in which the number of coupled flip flops is three.

8. The multi-clock controller circuit of claim 1, in which said circuit device for selecting an input comprises a multiplexer.

9. The multi-clock controller circuit of claim 8, in which the synchronizer stage controls the output of the multiplexer to selectively block the output clock signal from the output.

10. The multi-clock controller circuit of claim 9, also including a NAND gate having inputs coupled to the output of the multiplexer and the output of the synchronizer stage and having an output coupled to the output for providing the circuit output clock signal.

11. The multi-clock controller circuit of claim 1 in which the powering down places the multi-clock controller circuit in a low power dissipation mode.

12. The multi-clock controller circuit of claim 1, in which the synchronizer stage also delays the output signal for a period of time sufficient to avoid non-standard output pulses during powering up of the multi-clock controller circuit.

13. The multi-clock controller circuit of claim 1 wherein one of said first and second inputs can also function as another output when an input clock signal is applied to the other of said first and second inputs.

14. A multi-clock controller circuit, comprising:
- a first input for receiving a first type of input clock signal;
- a second input for receiving a second type of input clock signal;
- an output for providing a circuit output clock signal as determined by which one of the first or second type of input signal is applied to the multi-clock controller circuit;
- a circuit device for selecting one of the two inputs for coupling to said output; and
- a synchronizer stage for delaying the output signal for a period sufficient to avoid non-standard output pulses during powering down of the multi-clock controller circuit, wherein one of said first and second inputs can also function as another output when an input clock signal is applied to the other of said first and second inputs.

15. The multi-clock controller circuit of claim 14, also including a circuit element coupled to one of said inputs for preventing one of said first and second inputs from generating an output clock signal.

16. The multi-clock controller circuit of claim 15, in which said circuit element comprises a transistor.

17. A plurality of multi-clock controller circuits of claim 14, said circuits being cascaded together such that a first multi-clock controller circuit has an oscillator signal coupled to the first input thereof, and a second multi-clock controller circuit has its second input coupled to the second input of the first multi-clock controller circuit.

18. A method for providing an output clock signal from a circuit having at least two clock inputs, comprising the following steps:
- providing an active input clock signal of one of at least two types to one of the clock inputs of the circuit;
- selecting the active input clock signal, as determined by which one of the at least two clock inputs has an active input clock signal applied thereto, for coupling to an output of the circuit; and
- providing a delay for the commencement of output clock signals from the output of the circuit to avoid the propagation of non-standard output pulses during power up of the circuit.

19. The method of claim 18, in which the step of providing an active input clock signal comprises providing a crystal oscillator clock signal to said one of said clock inputs.

20. The method of claim 18, in which the step of providing an active input clock signal comprises providing a TTL clock signal to said one of said clock inputs.

21. The method of claim 18, in which the step of providing an active input clock signal comprises providing a CMOS clock signal to one of said clock inputs.

22. The method of claim 18, in which the selecting step comprises applying the active input clock signal to a multiplexer in the circuit.

23. The method of claim 18, in which the step of providing a delay comprises sequentially operating a plurality of coupled flip fops.

24. The method of claim 18 wherein the step of providing a delay for the commencement of output clock signals is also provided during power down of the circuit.

25. The multi-clock controller circuit of claim 24 in which the powering down places the multi-clock controller circuit in a low power dissipation mode.

26. The method of claim 18, wherein the step of selecting the active clock input signal and coupling to an output further comprises coupling the active clock input signal to another of the clock inputs.

27. A multi-clock controller circuit, comprising:
- first and second input clock means for supplying first and second input clock signals to said multi-clock controller circuit;
- an output for providing an output clock signal from said multi-clock controller circuit;
- an output for providing an output clock signal from said multi-clock controller circuit;
- selection means for selecting the first input clock signal when the first clock signal is the only clock signal that is active or the second clock signal when the second clock signal is the only clock signal that is active; and
- means for coupling the selected clock signal to the output.

28. The multi-clock controller circuit of claim 27 wherein one of said first and second inputs can also function as another output when an input clock signal is applied to the other of said first and second inputs.

29. A multi-clock controller circuit, comprising:
- a first input for receiving a first type of input clock signal;
- a second input for receiving a second type of input clock signal; and
- an output for providing a circuit output clock signal as determined b which one of the first or second type of input signal is applied to the multi-clock controller circuits, wherein one of said first and second inputs can also function as another output when an input clock signal is applied to the other of said first and second inputs.

30. A method for providing an output clock signal from a circuit having at least two clock inputs, comprising the following steps:
- providing an active input clock signal of one of at least two types to one of the clock inputs of the circuit; and
- selecting the active input clock signal, as determined by which one of the clock inputs has an active input clock signal applied thereto, for coupling to an output of the circuit and for coupling to the other of the clock inputs.

* * * * *

UNITED STATES PATENT AND TRADEMARK OFFICE
CERTIFICATE OF CORRECTION

PATENT NO. : 5,587,675
DATED : December 24, 1996
INVENTOR(S) : Kenneth C. Schmitt It is certified that error appears in the above-indentified patent and that said Letters Patent is hereby corrected as shown below:

Column 6, lines 34, and 35, delete "an output for providing an output clock signal from said multiclock controller circuit".

Signed and Sealed this

Nineteenth Day of August, 1997

*Attest:*

BRUCE LEHMAN

*Attesting Officer*       Commissioner of Patents and Trademarks